Figure 1:
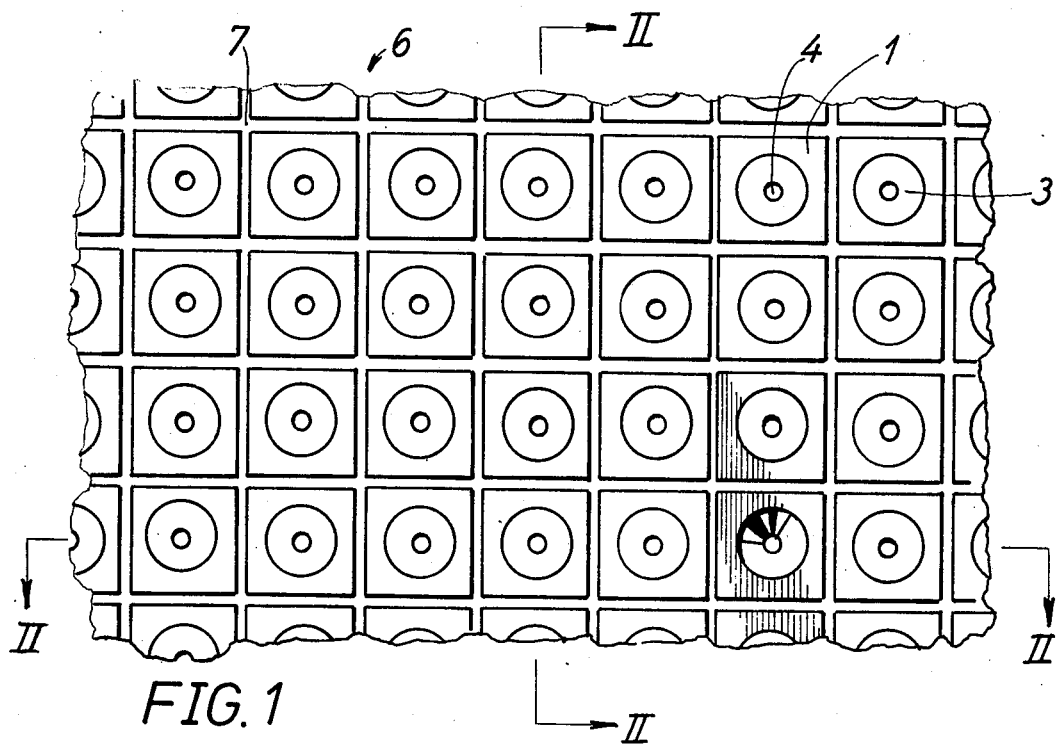

United States Patent [19]

Vestergaard

[11] 4,058,931
[45] Nov. 22, 1977

[54] CULTIVATION BLOCK AND A METHOD FOR THE MANUFACTURING OF SAME

[75] Inventor: Bent Vestergaard, Taastrup, Denmark

[73] Assignee: Kosan A/S, Copenhagen, Denmark

[21] Appl. No.: 688,996

[22] Filed: May 24, 1976

[30] Foreign Application Priority Data

May 28, 1975 Denmark .............................. 2357/75

[51] Int. Cl.² ............................................. A01G 9/02
[52] U.S. Cl. ........................................... 47/87; 47/74; 47/64
[58] Field of Search ..................... 47/74, 87, 63.4, 59

[56] References Cited

U.S. PATENT DOCUMENTS

| 2,175,113 | 10/1939 | Fischer | 47/59 |
|---|---|---|---|
| 2,988,441 | 6/1961 | Pruitt | 47/DIG. 7 |
| 3,513,593 | 5/1970 | Beck | 47/87 |
| 3,798,836 | 3/1974 | Rubens et al. | 47/DIG. 7 |
| 3,835,584 | 9/1974 | Shimazu | 47/73 X |
| 3,927,491 | 12/1975 | Farnsworth | 47/63 |

FOREIGN PATENT DOCUMENTS 1,278,529    6/1972    United Kingdom ..................... 47/87

*Primary Examiner*—Robert E. Bagwill
*Attorney, Agent, or Firm*—Kenyon & Kenyon

[57] ABSTRACT

A plant cultivation and support structure in the form of a strongly hygroscopic block having a flat base, an indentation located in the top large enough to hold a seed or a seed pellet, an open bore leading from the bottom of the indentation to the base, and at least one transverse channel extending clear through the block at the base. A plurality of blocks may be formed in rows and columns of an integral plate subdivided by mutually perpendicular sets of spaced narrow congruent grooves in the top and bottom surfaces of the plate. The material of the plate is a foamed light, brittle plastic having an elongated tandem cell structure with porous walls, a pH value not exceeding 5.2, and specific gravity between 3 and 15 kg/m³.

12 Claims, 3 Drawing Figures

U.S. Patent    Nov. 22, 1977    4,058,931

CULTIVATION BLOCK AND A METHOD FOR THE MANUFACTURING OF SAME

The invention relates to a plant cultivation block, in which a cutting, a seed or a seed pill respectively can germinate, or likewise a plant can grow, provided the requisite conditions for the growth are existing, and moreover to a method for the manufacturing of the described cultivation blocks.

To an ever growing extent cultivation blocks are as cultivating substratum for plants replacing earth or earth compounds, as it is more rational to work with plants in such blocks during growth as well as bedding out or harvest.

Already known are such cultivation units in the form of blocks or roundels made of mineral wool or foam material. None of these blocks are, however, ideal in use, as their smooth surface makes it difficult to place a seed or a seed pill in such a manner that they are resting protected, nor to achieve a sufficiently high relative humidity for the seed to sprout in the surrounding air, just as the developing roots are hampered in their direct way to the nutritious matter found preferably at the bottom of the block. Add hereto that when using blocks for cultivation in socalled "water cultures" the blocks must be placed either in broad furrows or on a drainage layer to secure that surplus water unhindered can pass the blocks through the drainage layer to the place of accumulation.

It is the object of the invention to remedy these shortcomings of already known blocks, and this is possible, if the block in the top surface is provided with an indention, in which the seed or the seed pill is placed, and from which said indention may pass a bore right through the block to the bottom, which will not allow the seed or the seed pill to pass through, and where the block at the bottom forms at least one channel permitting fluid to pass right through the block. By providing the block with an indention in which the seed can be placed, it will first and foremost be easier to insert the seed, but the seed will moreover be protected during its conveyance to the place of use. Furthermore there will in the said indention, in which the seed is placed, be created the ideal microclimate with a high humidity for the germination and growth of the seed. The bore will secure to the roots an unhindered penetration of the block and direct the way of the roots to the nutrient fluid. In the said bore cuttings can also easily be placed for rooting. And finally the channel at the bottom will allow fluid to pass through the block, by which extra channels and drainage layer can be avoided.

A plate subdivided into rows and columns of blocks in which the blocks are shaped with through channels offers an opportunity of collective watering of each plate and cultivation of small plants in an extremely rational way, as the plates may be placed direct on a plane watertight base without drainage layer, as the water can pass the plants.

Furthermore, crosswise situated channels in the base of the plate intersecting each block will offer ample space for the formation of roots in the correct position, and the plates can at discretion be situated in any direction without cutting off the channels. At the same time each block will be supported in all corners, which prevents upsetting. The said supports will likewise permit a constant and adequate suction up of nutrient fluid to the blocks, and besides distribute the fluid evenly beneath the plates.

By the application of the method described below for manufacturing of the blocks will be produced a hitherto unknown foam material the cells of which will be oblong and of practically the same length and be situated in the same direction, and as they have very thin walls they will leave to the material a very low specific gravity.

By the application of the method described below also will be produced a cultivation substratum which is ideal for the plants, with a suitable acidity reaction below the pH value of 5,2, as the plants are thriving better in a material having a value between 4,0 and 5,2.

By a subsequent heating of the foam material may eventually be achieved that the said material will be entirely neutralized for residual gases being harmful to the plants and causing them to die. The permeability of the material for roots and water will be increased by a further brittling of the cell walls, whereby the porous structure of the material will be noticeably increased.

Figure 2:
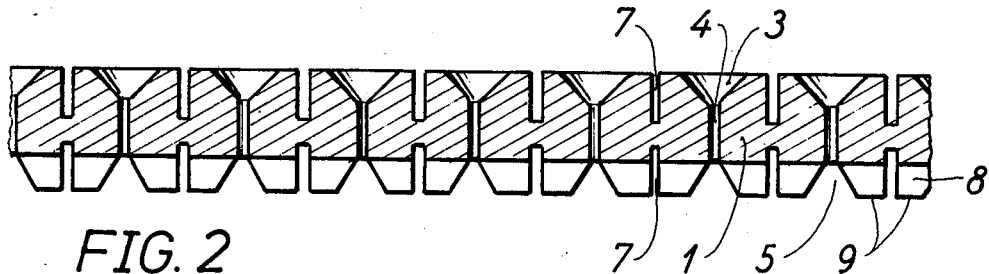
Figure 3:
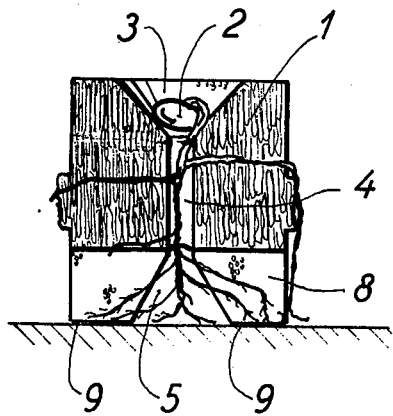

In the following the invention will be described in details with reference to the drawing, in which FIG. 1 shows a plate with block viewed from above, FIG. 2 shows the same plate in the section II—II of FIG. 1, and FIG. 3 shows a block cut through and a sprouting seed.

FIG. 1 shows a plate 6 cut out in straight lines of square blocks 1 having a central conical indention 3, as it appears from the section in FIG. 3. From the bottom of the said indention 3 there is made a bore 4, connecting the former with the underlying channels 5,8. The blocks are separated from each other by a flute 7, which is almost cutting through the the plates, leaving only a connection which is easily broken off, when the blocks are separated, and which renders to the roots ideal conditions of growth, as the separating flutes with the lower atmospheric relative humidity will bring about that the roots prefer to remain within the block, and thus are not torn over by the separation of the blocks.

The channel 5,8 at the bottom of the plate consists of a longitudinal groove, passing crosswise of the plate 6 in line with the bores 4, as seen from the FIGS. 2 and 3. Each block is thus at the bottom provided with crossing channels, forming four supports 9, on which the block can rest. The indention 3 can, as also FIG. 3 indicates, easily hold a seed or a seed pill 2. The seed can either be inserted on the spot of use or be placed and fastened to the block mechanically at the place of production. When later the seed is placed in the place of growth a microclimate will be established in the cone 3, which presents an adequately high relative humidity for sprouting and formation of roots. The roots will unhindered penetrate through the block via the bore 4, likewise retaining a high relative humidity, down to the channels 5,8 at the bottom, where the roots can find ample space to spread in the nutrient fluid in the channels. On account of the direct penetration by the roots to the nutrient fluid the plant is spared the rooting process through the "massive" part of the block, which will further the growth.

Especially in smaller sized blocks it can be difficult to produce a conical indention 3. This may be replaced by a longitudinal groove passing on the upper surface of the block from one edge to another. There may furthermore be made a further groove, so that the two grooves cross each other to form an indention limited by the four corners. It is particularly as concerns smaller blocks likewise possible to do without the bore 4, as the roots will easily find their way through the block to the nutrient fluid.

Hitherto known blocks made of foam material have not at the same time complied with the requirements of a well suited substratum. The material must offer a high hygroscopic effect for cultivation with satisfactory result of root crops like beets and carrots, which — as a matter of fact requires an effect of up to 15 cm. It must further be inactive and have a pH value not exceeding 5,2, in order that the phosphates shall not form non-absorbents. It must be light, brittle and have porous cell walls to allow penetration of the roots, and the cells must be arranged tandem fashioned. This will secure that the water is withheld in the material not having varying water permeability in different directions. It means further that the material is not drained for fluid, when the blocks are bedded out.

All these requirements are complied with at the same time when a foam material is manufactured of generally known ingredients like phenol-, urea- or melanin-formaldehyde resin, emulsifying agent, producing a uniform cell structure, remedies rendering it water absorbing, propellants forming the foam, hardeners, which can be acid or basic, and finally neutralizing agents.

By allowing the foaming to take place under vacuum in a mould the walls of which may be heated to a temperature equal to the maximum temperature attained in the compound, and possibly by making the walls smooth and repelling towards the material, it will be possible to produce long and similarly arranged cells in all the material. When these long cells are situated vertically in the finished blocks an unusually high hygroscopic effect from 2 to 15 cm will be the result, which will facilitate the cultivation of the above mentioned root crops.

To further accelerate the formation of oblong cells the shape of the mould i.e. in the direction of the raising of the foam may be at least three times the area of the bottom square. Where the need of formation of oblong cells is less important e.g. in case of smaller blocks the foam can raise in the already known manner without the use of vacuum.

The applied neutralizing agent shall secure that the acidity of the material will remain at a pH value not exceeding 5,2. To expel possible residuary gases and neutralize the material it is heated accordingly. The heating may vary between 100° C and 300° C, and is inversely proportional to the duration of the process. As an example can be mentioned that a plate of the thickness of 3 cm can be neutralized in abt. two minutes at a temperature of 150° C, and being afterwards entirely inactive. Depending on the cell dimension the specific gravity of the material will vary between 3 and 15 kg/m$^3$ and have an easy water absorption in the correct water/air relation. From all angles the water will remain in the block. This property of the block is utilized when for instance a head of lettuce is harvested with the roots still in the block. The lettuce will thereby keep fresh and crisp for further six hours due to the water reserve in the block. And it should be added that the water is not drained out when the block is bedded out in ordinary soil.

It will not rot and be entirely without any toxin. All requirements of a cultivation substratum have by the present method been complied with in such a manner that the maximum growth of the plants is achieved, and the applied material will likewise be suitable for automated cultivation systems, in which the plants are moved and supplied growth-regulating media entirely by automation.

I claim:

1. A plant cultivation and support structure adapted for germinating and growing a plant from a seed or from a cutting, the structure comprising a hygroscopic, root penetrable block having a flat base, a top spaced above the base, an indentation located in the top, the indentation being large enough to hold a seed or a seed pellet, an open bore leading from the bottom of the indentation of the base, the bore being small enough to prevent passage of a seed while permitting unhindered passage of roots therethrough, and at least one transverse channel extending clear through the block at the base, whereby the base of the block is adapted to rest without tipping on a flat planar support over which passes nutrient-bearing liquid, with the liquid passing unhindered through the channel so that there is no need for drainage means in the planar support.

2. A plant cultivation and support structure according to claim 1 wherein the at least one channel in the bottom of the block is in the form of an open downward-facing groove in the base of the block.

3. A plant cultivation and support structure according to claim 2 wherein the open downward-facing groove intersects the axis of the vertical bore.

4. A plant cultivation and support structure according to claim 1 wherein the at least one channel in the bottom of the block comprises a pair of channels intersecting the axis of the vertical groove at right angles to each other.

5. A plant cultivation and support structure according to claim 4 wherein the pair of channels comprise a pair of V-shaped grooves formed in the base of the block.

6. A plant cultivation and support structure according to claim 1 wherein the block is composed of a brittle foamed plastic having elongated tandem cells with porous walls, a pH value not exceeding 5.2 and a specific gravity between 3 and 15 kg/m$^3$.

7. A plant cultivation and support structure according to claim 6 wherein the material of the block exhibits a capillarity effect of from 2 to 15 cm of water.

8. A plant cultivation and support structure according to claim 6 wherein the foamed plastic comprises a resin selected from the group phenol-, urea-, or melaninformaldehyde.

9. A plant cultivation and support structure adapted for germinating and growing plants from seeds or cuttings, the structure comprising a unitary, flat rectangular plate of porous hygroscopic root penetrable material, the plate having a flat bottom surface and a top surface, each surface being subdivided into rows and columns of blocks by mutually perpendicular sets of spaced narrow grooves, the grooves in the top surface being coincident with the grooves in the bottom surface; wherein each block has an indentation in the top surface adapted to hold a seed or a seed pellet, an open bore extending from the bottom of the indentation to the bottom of the plate, the bore being small enough to prevent passage of a seed while permitting unhindered passage of roots therethrough; and a set of spaced channels along the bottom surfaces of each row of blocks intermediate adjacent ones of the grooves in the bottom surface of the plate and intersecting the bores of the blocks of each row, whereby the channels permit unhindered passage of nutrientbearing liquid when the bottom of the plate is resting on an unbroken planar surface.

10. A plant cultivation and support structure according to claim 9 comprising an additional set of spaced channels extending along the bottom surfaces of each column of blocks and intersecting the first-mentioned set of channels coincidentially with the bores of the blocks of each column.

11. A plant cultivation and support structure according to claim 9 wherein the plate is composed of a brittle foamed plastic having elongated cells aligned generally perpendicularly to the top and bottom surfaces of the plate.

12. A plant cultivation and support structure according to claim 11 wherein the foamed plastic has a pH value not exceeding 5.2 and a specific gravity between 3 and 15 kg/m$^3$.

* * * * *